United States Patent
Narishige et al.

(10) Patent No.: US 8,247,075 B2
(45) Date of Patent: Aug. 21, 2012

(54) MODIFIED PEROVSKITE COMPLEX OXIDE, METHOD FOR PRODUCING THE SAME AND COMPOSITE DIELECTRIC MATERIAL

(75) Inventors: Naoaki Narishige, Tokyo (JP); Shinji Tanabe, Tokyo (JP)

(73) Assignee: Nippon Chemical Industrial Co., Ltd., Koto-ku, Tokyo (JP)

(*) Notice: Subject to any disclaimer, the term of this patent is extended or adjusted under 35 U.S.C. 154(b) by 0 days.

(21) Appl. No.: 12/523,867

(22) PCT Filed: Jan. 16, 2008

(86) PCT No.: PCT/JP2008/050446
§ 371 (c)(1),
(2), (4) Date: Mar. 9, 2010

(87) PCT Pub. No.: WO2008/087985
PCT Pub. Date: Jul. 24, 2008

(65) Prior Publication Data
US 2010/0168307 A1    Jul. 1, 2010

(30) Foreign Application Priority Data
Jan. 18, 2007 (JP) ................. 2007-008747
Jun. 27, 2007 (JP) ................. 2007-169764

(51) Int. Cl.
*B32B 5/16* (2006.01)
*B32B 9/00* (2006.01)
*B01J 21/00* (2006.01)

(52) U.S. Cl. ........ 428/403; 428/405; 501/134; 501/135; 502/240

(58) Field of Classification Search .............. 524/200, 524/413; 428/209, 404, 403, 405; 525/65, 525/113; 501/134, 135; 523/200, 204; 502/240
See application file for complete search history.

(56) References Cited

U.S. PATENT DOCUMENTS

2005/0031849 A1    2/2005 Kawabata et al.
2007/0049485 A1*   3/2007 Tanabe et al. .............. 501/136

FOREIGN PATENT DOCUMENTS

| JP | 7-240117 A    | 9/1995 |
| JP | 8-17242 A     | 1/1996 |
| JP | 9-202864 A    | 8/1997 |
| JP | 2002-226816 A | 8/2002 |
| JP | 2003-49092 A  | 2/2003 |
| JP | 2003-137649 A | 5/2003 |
| JP | 2003-192768 A | 7/2003 |
| JP | 2003-327827 A | 11/2003 |
| JP | 2004-253219 A | 9/2004 |
| JP | 2005-002281 A | 1/2005 |
| JP | 2005-008665 A | 1/2005 |
| JP | 2005-15652 A  | 1/2005 |
| JP | 2005-29700 A  | 2/2005 |
| WO | 2005-093763 A | 10/2005 |

OTHER PUBLICATIONS

Machine Translation of JP 09-202864.*
Machine Translation of JP 07-240117.*
Full English Translation of JP 07-240117.*

* cited by examiner

*Primary Examiner* — Vasu Jagannathan
*Assistant Examiner* — Hannah Pak
(74) *Attorney, Agent, or Firm* — Smith Patent Office

(57) ABSTRACT

It is an object of the present invention to provide: a modified perovskite-type composite oxide, which effectively suppresses elution of A-site metals from a perovskite-type composite oxide, and which can be particularly preferably used as an inorganic filler for a composite dielectric body; a method for producing the same; and a composite dielectric material using the same. The modified perovskite-type composite oxide of the present invention is produced by primarily coating the particle surface of a perovskite-type composite oxide with silica and then secondarily coating it with a coupling agent, characterized in that the layer primarily coated with silica is produced by performing a heat treatment at 800° C. to 1200° C. on hydrolyzed silica obtained by the hydrolysis of tetraalkoxysilane.

1 Claim, No Drawings

MODIFIED PEROVSKITE COMPLEX OXIDE, METHOD FOR PRODUCING THE SAME AND COMPOSITE DIELECTRIC MATERIAL

TECHNICAL FIELD

The present invention relates to a modified perovskite-type composite oxide particularly useful as an inorganic filler of a composite dielectric body, and a method for producing the same, and a composite dielectric material using the same.

BACKGROUND ART

In order to produce small-sized, thin, and high-density electronic components, a multilayer board has been frequently used as a printed wiring board. By establishing a high-dielectric layer on the inner layer or surface layer of such multilayer printed wiring board, the package density is improved, and it becomes possible to produce smaller-sized, thinner, and higher-density electronic components.

In the conventional high-dielectric layer material, a ceramic sintered body obtained by molding ceramic particles and then sintering the resultant has been used. Thus, the size and form of the material has been restricted by a molding method. In addition, since a sintered body is very hard and fragile, it has been difficult to freely process it, and thus it has been extremely difficult to obtain any given shape or a complicated shape.

Under such circumstances, a composite dielectric body formed by dispersing inorganic dielectric particles used as inorganic fillers in a resin has drawn attention. Various proposals have been made for the use of, for example, a perovskite-type composite oxide as such inorganic filler with a high dielectric constant used in the aforementioned composite dielectric body. Also, the present applicant has previously proposed a perovskite-type composite oxide useful as an inorganic filler in Patent Document 1 below.

However, if a perovskite-type composite oxide is brought into contact with water, A-site materials contained in the structure thereof, such as Ba, Ca, Sr, and Mg, are particularly eluted. Thus, it has been pointed out that such elution of A-site metals may cause destruction such as the peeling of a resin interface or insulation deterioration due to ion migration.

For the purpose of improving resin dispersibility, a method of treating the surface of a barium titanate powder particle with a silane coupling agent has been proposed, for example (see Patent Documents 2-6, for example).

However, even if the particle surface of barium titanate is simply coated with a coupling agent, the effect of reducing elution of A-site metals such as Ba is low. Thus, it has been desired to develop an inorganic filler used in a composite dielectric body, in which the amounts of the eluted metals are reduced.

Patent Document 1: International Publication WO2005/093763, pamphlet
Patent Document 2: Japanese Patent Laid-Open No. 2003-49092
Patent Document 3: Japanese Patent Laid-Open No. 2004-253219
Patent Document 4: Japanese Patent Laid-Open No. 2005-2281
Patent Document 5: Japanese Patent Laid-Open No. 2005-8665
Patent Document 6: Japanese Patent Laid-Open No. 2005-15652

DISCLOSURE OF THE INVENTION

Problems to be Solved by the Invention

Accordingly, it is an object of the present invention to provide: a modified perovskite-type composite oxide, which effectively suppresses elution of A-site metals from a perovskite-type composite oxide and which can be particularly preferably used as an inorganic filler for a composite dielectric body; a method for producing the same; and a composite dielectric material using the same.

Means for Solving the Problems

In order to achieve the aforementioned object, a first aspect according to the present invention provides a modified perovskite-type composite oxide, which is produced by primarily coating the particle surface of a perovskite-type composite oxide with silica and then secondarily coating the resultant particle surface with a coupling agent, characterized in that the layer primarily coated with silica is produced by performing a heat treatment at 800° C. to 1200° C. on hydrolyzed silica obtained by the hydrolysis of tetraalkoxysilane.

In addition, a second aspect according to the present invention is a method for producing the above-described modified perovskite-type composite oxide, characterized in that it comprises the following steps (A1) to (A4):

(A1) preparing a slurry comprising a perovskite-type composite oxide and a hydrophilic organic solvent;

(A2) adding tetraalkoxysilane to the slurry, and carrying out a hydrolysis reaction in the presence of a catalyst to precipitate silica on the particle surface of the perovskite-type composite oxide, so as to obtain a perovskite-type composite oxide coated with the hydrolyzed silica;

(A3) drying and then performing a heat treatment at 800° C. to 1200° C. on the perovskite-type composite oxide coated with the hydrolyzed silica, so as to obtain a perovskite-type composite oxide that is primarily coated with silica; and (A4) allowing the perovskite-type composite oxide that is primarily coated with silica to come into contact with a coupling agent.

Moreover, a third aspect according to the present invention is a composite dielectric material, characterized in that it comprises the modified perovskite-type composite oxide of the first aspect and a polymeric material.

BEST MODE FOR CARRYING OUT THE INVENTION

The present invention will be described in detail based on its preferred embodiments.

(Modified Perovskite-Type Composite Oxide)

The modified perovskite-type composite oxide of the present invention is a modified perovskite-type composite oxide, which is produced by primarily coating the particle surface of a perovskite-type composite oxide with silica and then secondarily coating the resultant particle surface with a coupling agent, characterized in that the layer primarily coated with silica is produced by performing a heat treatment at 800° C. to 1200° C. on hydrolyzed silica obtained by the hydrolysis of tetraalkoxysilane.

The type of the aforementioned modified perovskite-type composite oxide is not particularly limited. It is preferably $ABO_3$-type perovskite, in which one or more of metal elements selected from the group consisting of Ca, Ba, Sr and Mg are disposed in its A site, and one or two of metal elements selected from the group consisting of Ti and Zr are disposed in its B site. Specific examples of a preferred compound as such a modified perovskite-type composite oxide include $BaTiO_3$, $CaTiO_3$, $SrTiO_3$, $MgTiO_3$, $Ba_xCa_{1-x}TiO_3$ wherein $0<x<1$, $Ba_xSr_{1-x}ZrO_3$ wherein $0<x<1$, $BaTi_xZr_{1-x}O_3$ wherein $0<x<1$, and $Ba_xCa_{1-x}Ti_yZr_{1-y}O_3$ wherein $0<x<1$, $0<y<1$. These perovskite-type composite oxides may be used singly or in combination of two or more types.

The production history of such perovskite-type composite oxide is not particularly limited. For example, perovskite-type composite oxides produced by ordinary methods such as coprecipitation, hydrolysis, a wet process such as a hydrothermal synthesis method, a sol-gel method, and a solid-phase method, are used. The physical properties of such perovskite-type composite oxide are not particularly limited. A perovskite-type composite oxide having BET specific surface area of 0.5 to 12 $m^2/g$, and preferably 1.5 to 6 $m^2/g$, is preferable in terms of handling ability, dispersibility, and resin adhesion. Furthermore, a perovskite-type composite oxide having a mean particle diameter of 0.1 to 2 μm, and preferably 0.2 to 1 μm, is preferable because it further improves handling ability and dispersibility. This mean particle diameter is obtained by a laser light scattering method. Further, in order to obtain a product with high purity, a perovskite-type composite oxide with low impurities content is particularly preferable.

The aforementioned modified perovskite-type composite oxide may comprise accessory ingredient elements. Such accessory ingredient elements are one or more selected from metal elements, metalloid elements, transition metal elements, and rare earth elements, having an atomic number of 3 or greater, other than elements in A-site and B-site that constitute a perovskite-type composite oxide. Among these, at least one or more selected from rare earth elements Sc, Y, La, Ce, Pr, Nd, Pm, Sm, Eu, Gd, Tb, Dy, Ho, Er, Tm, Yb and Lu, and V, Bi, Al, W, Mo, Nb and Si are preferable. The content of such accessory ingredient element is 0.1 to 20 mol %, and preferably 0.5 to 5 mol %, with respect to the perovskite-type composite oxide.

Moreover, the particle shape of the perovskite-type composite oxide is not particularly limited. It may be a spherical, granular, planar, scale-like, whisker-like, rod-like, or filamentous shape.

A characteristic feature of the modified perovskite-type composite oxide of the present invention is that the layer primarily coated with silica is produced by performing a heat treatment within a certain temperature range on hydrolyzed silica obtained by the hydrolysis of tetraalkoxysilane.

The usable tetraalkoxysilane is represented by general formula $Si(OR)_4$, wherein R preferably represents a linear or branched alkyl group containing 1 to 6 carbon atoms. Specific compounds include tetramethoxysilane, tetraethoxysilane, tetra-n-propoxysilane, tetraisopropoxysilane, and tetra-n-butoxysilane.

The temperature required for the aforementioned heat treatment is 800° C. to 1200° C., and preferably 900° C. to 1100° C. This is because, if such heat treatment temperature is less than 800° C., it becomes difficult to carry out further densification of the surface silica layer, and the effect of reducing elution of A-site metals is low. There may be cases in which the amounts of A-site metals eluted would increase, or in which a relative dielectric constant would decrease. In contrast, if such heat treatment temperature exceeds 1200° C., fusion of particles and grain growth significantly occur, and thus it is likely that the shape and size of a perovskite-type composite oxide serving as a substrate cannot be maintained. Further, the time required for the heat treatment is set at 3 hours or more, and preferably at 3 to 10 hours.

The amount of silica on the first coated layer is $3\times10^{-5}$ to $40\times10^{-5}$ mol/$m^2$, and preferably $5\times10^{-5}$ to $15\times10^{-5}$ mol/$m^2$, with respect to the surface area of a perovskite-type composite oxide. This is because, if the amount of the coating silica is less than $3\times10^{-5}$ mol/$m^2$, the coating amount is insufficient, and a sufficient elution-reducing effect may not be obtained. In contrast, if the amount of the silica exceeds $40\times10^{-5}$ mol/$m^2$, the dielectric property of the perovskite-type composite oxide serving as a substrate is likely to decrease.

Further, in the present invention, it has been found that, if there are unevenly coated portions or uncoated exposed portions on the surface of the particle of a perovskite-type composite oxide, pH becomes high, and thus it becomes possible to suppress elution of A-site metals that are continuously eluted. Accordingly, in addition to the aforementioned physical properties, it is preferable that a perovskite-type composite oxide having a first silica-coated layer have a pH value of pH 8.0 or less, preferably pH 7.8 or less, and particularly preferably pH 5.0 to 7.8. The aforementioned pH range is preferable because there are no exposed portions and a uniform continuous film can be formed, and thereby the perovskite-type composite oxide is able to exhibit an excellent effect of suppressing elution of A-site metals that are continuously eluted.

Such pH value is obtained by adding 100 g of purified water to 4 g of the modified perovskite-type composite oxide, stirring the mixture at 25° C. for 60 minutes, and then measuring the pH of a supernatant using a pH meter.

The modified perovskite-type composite oxide of the invention is produced by primarily coating the particle surface of a perovskite-type composite oxide with the aforementioned silica and then secondarily coating the resultant particle surface with a coupling agent. In comparison with the perovskite-type composite oxide primarily coated with silica, the modified perovskite-type composite oxide can further suppress elution of A-site metals.

As a coupling agent, common coupling agents, which have been widely used in the industrial field or as reagents, can be used. Preferred coupling agents that can be used herein include silane coupling agents, aluminum coupling agents, titanate coupling agents, and zirconate coupling agents. These coupling agents can be used singly or in combination of two or more types.

Examples of silane coupling agents include γ-(2-aminoethyl)aminopropyltrimethoxysilane, γ-(2-aminoethyl)aminopropylmethyldimethoxysilane, aminosilane, γ-aminopropyltriethoxysilane, N-(2-aminoethyl)-3-aminopropyltrimethoxysilane, N-β-(N-vinylbenzylaminoethyl)-γ-aminopropyltrimethoxysilane, hexamethyldisilazane, trimethylsilane, trimethylchlorsilane, dimethyldichlorsilane, methyltrichlorsilane, allyldimethylchlorsilane, benzyldimethylchlorsilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, γ-methacryloxypropyltrimethoxysilane, vinyltriacetoxysilane, γ-chloropropyltrimethoxysilane, β-(3,4-ethoxycyclohexyl)ethyltrimethoxysilane, γ-glycidoxypropyltrimethoxysilane, γ-mercaptopropyltrimethoxysilane, N-β-(aminoethyl)-γ-aminopropyltrimethoxysilane, γ-ureidopropyltriethoxysilane, and aminofluorosilane.

Examples of aluminum coupling agents include ethyl acetoacetate aluminum diisopropylate, methyl acetoacetate aluminum diisopropylate, ethyl acetate aluminum dibutylate, alkyl acetoacetate aluminum diisopropylate, and aluminum monoacetyl acetate bis(ethylacetoacetate).

Examples of titanate coupling agents include coupling agents in which the type of a side chain is amino, phosphorous acid, pyrophosphoric acid, or carboxylic acid. Specific examples include isopropyl triisostearoyl titanate, isopropyl tridodecylbenzenesulfonyl titanate, isopropyl tris(dioctylpyrophosphate)titanate, tetraoctyl bis(ditridecylphosphite)titanate, tetra(2,2-diallyloxymethyl-1-butyl)bis(di-tridecyl) phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate) titanate, isopropyltricumylphenyl titanate, isopropyltri(N-aminoethyl-aminoethyl) titanate, dicumylphenyloxy acetate titanate, diisostearoylethylene titanate, polydiisopropyl titanate, tetranormalbutyl titanate, and polydinormalbutyl titanate.

Examples of zirconate coupling agents include zirconium alkoxides such as ethoxy zirconium stearate, zirconium chelate compounds such as zirconium tetraacetyl acetonate or zirconium α-hydroxycarboxylate, zirconium soaps, and zirconium acetate.

In the present invention, among these coupling agents, titanate coupling agents are preferably used in that they have a particularly high effect of reducing elution of A-site metals.

The coating amount of such coupling agent is 0.04% to 5% by weight, and preferably 0.5% to 3% by weight, with respect to the weight of the perovskite-type composite oxide primarily coated with silica. This is because, if the coating amount of the coupling agent is less than 0.04% by weight, a coating process becomes insufficient, and thus a surface modification effect may not be exhibited, and if it exceeds 5% by weight, such coating becomes excessive, and such excessive coating may reduce the dielectric property of the perovskite-type composite oxide.

Moreover, with regard to the above defined pH, the modified perovskite-type composite oxide of the present invention has pH 8.0 or less, preferably pH 7.5 or less, and particularly preferably pH 5.0 to 7.5. Since there are no exposed portions and a uniform continuous film can be formed within the aforementioned pH range, the modified perovskite-type composite oxide particularly preferably has an excellent effect of suppressing elution of A-site metals that are continuously eluted.

<Method for Producing Modified Perovskite-Type Composite Oxide>

The modified perovskite-type composite oxide of the present invention is preferably produced by the following steps (A1) to (A4):

(A1) preparing a slurry comprising a perovskite-type composite oxide and a hydrophilic organic solvent;

(A2) adding tetraalkoxysilane to the slurry, and carrying out a hydrolysis reaction in the presence of a catalyst to precipitate silica on the particle surface of the perovskite-type composite oxide, so as to obtain a perovskite-type composite oxide coated with the hydrolyzed silica;

(A3) drying and then performing a heat treatment at 800° C. to 1200° C. on the perovskite-type composite oxide coated with the hydrolyzed silica, so as to obtain a perovskite-type composite oxide that is primarily coated with silica; and (A4) allowing the perovskite-type composite oxide that is primarily coated with silica to come into contact with a coupling agent.

As operations in the step (A1), first, 100 to 900 parts by weight of, and preferably 150 to 400 parts by weight of a hydrophilic organic solvent is added to 100 parts by weight of the aforementioned modified perovskite-type composite oxide, so as to prepare a slurry in which the particles of the perovskite-type composite oxide are uniformly dispersed.

The type of the aforementioned hydrophilic organic solvent is not particularly limited, as long as it has affinity for water and it is mixed with water to form a uniform solution. Preferred examples of such hydrophilic organic solvent include glycol and alcohol. One or more of such solvents can be used. Examples of glycol include propylene glycol monoethyl ether, propylene glycol monomethyl ether, dipropylene glycol monomethyl ether, diethylene glycol monobutyl ether, ethylene glycol, propylene glycol, and diethylene glycol. Examples of alcohol include methanol, ethanol, isopropyl alcohol, butanol, and pentanol. Of these, propylene glycol monoethyl ether, dipropylene glycol monomethyl ether, diethylene glycol monobutyl ether, methanol, ethanol, isopropyl alcohol, and butanol are particularly preferable from the viewpoint of the dispersibility of the perovskite-type composite oxide.

In the step (A1), for uniform dispersion, it is preferable to use, as necessary, a dispersing device such as a high-speed agitator, a colloid mill, or a homogenizer, to prepare a slurry in which a perovskite-type composite oxide is uniformly dispersed. In addition, a commonly used dispersant may be added to such slurry, as necessary.

In the step (A2), tetraalkoxysilane, water, and a catalyst are added to the slurry prepared in the step (A1), followed by a hydrolysis reaction, so that hydrolyzed silica can be uniformly precipitated on the particle surface of the perovskite-type composite oxide.

The usable tetraalkoxysilane is as described above. The additive amount of the tetraalkoxysilane should be calculated from the molecular weight of the tetraalkoxysilane based on the optimal coating amount of the aforementioned silica. It is generally 1% to 15% by weight and preferably 2% to 8% by weight with respect to the weight of the perovskite-type composite oxide. This is because, if the additive amount of tetraalkoxysilane is less than 1% by weight, the amount of silica precipitated becomes insufficient, and the optimal coating amount of the silica cannot be obtained, and if it exceeds 15% by weight, the viscosity in the system significantly increases, attended with the hydrolysis of tetraalkoxysilane, and uniform agitation cannot be achieved.

Water is added at a molar ratio of 5:1 to 100:1, and preferably 10:1 to 50:1, with respect to tetraalkoxysilane.

Examples of a catalyst that can be used herein include: inorganic alkaline compounds such as ammonia, sodium hydroxide, or potassium hydroxide; inorganic alkaline salts such as ammonium carbonate, ammonium bicarbonate, sodium carbonate, or sodium bicarbonate; organic alkaline compounds such as monomethylamine, dimethylamine, trimethylamine, monoethylamine, diethylamine, triethylamine, ethylenediamine, pyridine, aniline, choline, tetramethylammonium hydroxide, or guanidine; and organic alkaline salts such as ammonium formate, ammonium acetate, monomethylamine formate, dimethylamine acetate, pyridine lactate, guanidinoacetic acid, or aniline acetate.

The aforementioned catalyst is added at a molar ratio of 0.2:1 to 10:1, and preferably 0.5:1 to 5:1, with respect to tetraalkoxysilane. The catalyst is preferably added to the aforementioned slurry in the form of a solution prepared by dissolving it in water.

As conditions for the hydrolysis reaction, the reaction temperature is 40° C. to 120° C., and preferably 50° C. to 90° C., and the reaction time is 1 hour or more, and preferably 3 to 10 hours. Such hydrolysis reaction is preferably carried out under stirring.

After completion of the reaction, solid-liquid separation is carried out according to an ordinary method. Thereafter, the resultant is washed, as necessary, so as to recover a perovskite-type composite oxide coated with the hydrolyzed silica. It is then dried. The type of a method of recovering such perovskite-type composite oxide is not particularly limited. Means such as spray drying may be applied.

As conditions for the drying process, the drying temperature is set at 40° C. or higher, and preferably at 60° C. to 120° C. This is because, if the temperature required for heat treatment is less than 40° C., the reaction efficiency from hydrolysis to dehydration condensation is low, and thereby a dense silica-coated layer is hardly formed. It is sufficient that the time required for the dry processing be set at 1 hour or more, and preferably at approximately 3 to 10 hours.

The step (A3) is a step of subjecting the perovskite-type composite oxide coated with the hydrolyzed silica obtained in the step (A2) to a heat treatment at 800° C. to 1200° C., and preferably at 900° C. to 1100° C., so as to obtain a perovskite-type composite oxide that is primarily coated with silica.

In a method for producing the modified perovskite-type composite oxide of the present invention, the perovskite-type composite oxide coated with the hydrolyzed silica is subjected to a heat treatment at a temperature within the aforementioned range, so that elution of A-site elements can be further reduced. If the heating temperature is less than 800° C., densification of the silica layer on the surface is insufficient, and thus the effect obtained by the heat treatment becomes insufficient. Moreover, a relative dielectric constant is likely to become low. In contrast, if the heating temperature exceeds 1200° C., fusion between particles and grain growth significantly occur, and thus it is likely that the shape and size of the substrate cannot be maintained. Further, the time required for the heat treatment is set at 2 hours or more, and preferably at 3 to 10 hours.

After completion of the heat treatment, the resultant is cooled, as appropriate, and it is then disintegrated if necessary, so as to obtain a perovskite-type composite oxide that is primarily coated with silica.

If such perovskite-type composite oxide that is primarily coated with silica has pH 8.0 or less, preferably pH 7.8 or less, and particularly preferably pH 5.0 to 7.8, as defined above, it has no exposed portions, and a uniform continuous film is formed thereon. Thus, a modified perovskite-type composite oxide obtained by subjecting such perovskite-type composite oxide that is primarily coated with silica to a second coating process using a coupling agent is particularly preferable in that it has an excellent effect of suppressing elution of A-site metals that are continuously eluted.

The step (A4) is a step of allowing the perovskite-type composite oxide primarily coated with silica obtained in the step (A3) to come into contact with a coupling agent, so that the particle surface of the perovskite-type composite oxide primarily coated with silica is secondarily coated with the coupling agent to obtain the modified perovskite-type composite oxide of the present invention.

The contact of the perovskite-type composite oxide primarily coated with silica with the aforementioned coupling agent can be carried out by a wet process or a dry process.

When such contact is carried out by a wet process, a solvent containing a desired concentration of the coupling agent is prepared. Thereafter, (1) the perovskite-type composite oxide primarily coated with silica is immersed in the solvent, and the aforementioned component together with the solvent is then subjected to spray drying; or (2) after completion of the immersion, solid-liquid separation and the subsequent drying process are carried out; or (3) the hydrolysis reaction of the coupling agent is carried out in the solvent containing the perovskite-type composite oxide primarily coated with silica, followed by recovery, and thereafter, the resultant is dried at a temperature of 40° C. or higher, and preferably 60° C. to 120° C., thereby obtaining a modified perovskite-type composite oxide in which the particle surface of the perovskite-type composite oxide primarily coated with silica is secondarily coated with the aforementioned coupling agent.

The aforementioned solvent may be selected, as appropriate, depending on the type of the coupling agent. It may be either water or an organic solvent. Otherwise, it may also be a mixed solvent of water and an organic solvent. In addition, as a hydrolysis reaction, a coating process may be carried out in the presence of a catalyst, as necessary. Examples of a catalyst that can be used herein include: inorganic alkaline compounds such as ammonia, sodium hydroxide, or potassium hydroxide; inorganic alkaline salts such as ammonium carbonate, ammonium bicarbonate, sodium carbonate, or sodium bicarbonate; organic alkaline compounds such as monomethylamine, dimethylamine, trimethylamine, monoethylamine, diethylamine, triethylamine, ethylenediamine, pyridine, aniline, choline, tetramethylammonium hydroxide, or guanidine; and organic alkaline salts such as ammonium formate, ammonium acetate, monomethylamine formate, dimethylamine acetate, pyridine lactate, guanidinoacetic acid, or aniline acetate. Such a catalyst can be used in the form of a solution prepared by dissolving it in water. The aforementioned catalyst is added at a molar ratio of 0.1:1 to 5:1, and preferably 0.5:1 to 2:1, with respect to the coupling agent. As conditions for the hydrolysis reaction, the reaction temperature is 20° C. to 120° C., and preferably 60° C. to 90° C., and the reaction time is 0.5 hour or more, and preferably 1 to 10 hours. Such hydrolysis reaction is preferably carried out under stirring.

On the other hand, in the case of a dry process, a method comprising fully mixing the aforementioned coupling agent with the perovskite-type composite oxide primarily coated with silica using an agitator such as a Henschel mixer in a dry process and then drying as necessary; or a method comprising diluting the coupling agent with a solvent, adding the perovskite-type composite oxide primarily coated with silica to the diluted solution to fully mix them using an agitator such as a Henschel mixer, and then heating and drying the mixture, thereby obtaining the modified perovskite-type composite oxide of the present invention in which the particle surface of the perovskite-type composite oxide primarily coated with silica is secondarily coated with the aforementioned coupling agent.

As described above, it is desired that the coating amount of the coupling agent be determined at a weight percentage of 0.04% to 5%, and preferably 0.5% to 3%, with respect to the weight of the perovskite-type composite oxide primarily coated with silica.

The thus obtained modified perovskite-type composite oxide of the present invention suppresses elution of A-site metals such as Ba, Ca, Sr, and Mg, caused by the contact of a perovskite-type composite oxide with water content or the like. Such modified perovskite-type composite oxide can be particularly preferably used as an inorganic filler for a composite dielectric body consisting of a polymeric material such as a thermosetting resin, a thermoplastic resin or a photosensitive resin, and an inorganic filler. Moreover, the modified perovskite-type composite oxide can also be applied to various purposes such as an additive agent for toners.

Next, the composite dielectric material of the present invention will be described.

The composite dielectric material of the present invention comprises a polymeric material and the aforementioned modified perovskite-type composite oxide serving as an inorganic filler.

The composite dielectric material of the present invention is preferably a material having a relative dielectric constant of 15 or greater, and preferably 20 or greater, which can be produced by adding 60% or more by weight of, and preferably 70% to 85% by weight of the aforementioned modified perovskite-type composite oxide to the polymeric material as described later.

Polymeric materials that can be used in the present invention include thermosetting resins, thermoplastic resins, photosensitive resins, and the like.

Known thermosetting resins can be used. Examples of such thermosetting resin include an epoxy resin, a phenol resin, a polyimide resin, a melamine resin, cyanate resins, bismaleimides, addition polymers of bismaleimides and diamine, a multifunctional cyanate resin, a double-bond-added polyphenylene oxide resin, an unsaturated polyester resin, a polyvinyl benzyl ether resin, a polybutadiene resin, and a fumarate resin. A thermosetting resin, which is excellent in terms of heat resistance during a thermosetting process, is preferably used. These thermosetting resins may be used singly or by mixing them. However, examples of such thermosetting resin are not limited to those as described above. Among these thermosetting resins, an epoxy resin or a polyvinyl benzyl ether resin is preferable in terms of the balance of heat resistance, workability, and price.

The epoxy resin used in the present invention means monomers, oligomers, and polymers as a whole, which have at least two epoxy groups in a single molecule. Examples of such epoxy resin include: those obtained by epoxidation of novolac resins, including, as typical examples, a phenol novolac epoxy resin and an o-cresol novolac epoxy resin, which are obtained by condensing or co-condensing, in the presence of an acidic catalyst, phenols such as phenol, cresol, xylenol, resorcin, catechol, bisphenol A or bisphenol F, and/or naphthols such as α-naphthol, β-naphthol or dihydroxynaphthalene, and aldehydes such as formaldehyde, acetaldehyde, propionealdehyde, benzaldehyde or salicylaldehyde; those obtained by epoxidation of additions or polyadditions of diglycidyl ethers or phenols such as bisphenol A, bisphenol B, bisphenol F, bisphenol S, or alkyl-substituted or -unsubstituted bisphenol, and dicyclopentadienes or terpenes; glycidyl ester epoxy resins obtained by the reaction of polybasic acid such as phthalic acid or dimer acid with epichlorohydrin; glycidyl amine epoxy resins obtained by the reaction of polyamine such as diaminodiphenylmethane or isocyanuric acid with epichlorohydrin; linear fatty acid epoxy resins obtained by oxidizing an olefin bond with peracid such as peracetic acid; and alicyclic epoxy resins. However, examples are not particularly limited thereto. These epoxy resins may be used singly or in combination of two or more types.

All epoxy resin hardening agents that are known to persons skilled in the art can be used herein. Particular examples of such epoxy resin hardening agent include: $C_2$-$C_{20}$ linear aliphatic diamines such as ethylenediamine, trimethylenediamine, tetramethylenediamine, or hexamethylenediamine; amines such as metaphenylenediamine, paraphenylenediamine, paraxylenediamine, 4,4'-diaminodiphenylmethane, 4,4'-diaminodiphenylpropane, 4,4'-diaminodiphenylether, 4,4'-diaminodiphenylsulfone, 4,4'-diaminodicyclohexane, bis(4-aminophenyl)phenylmethane, 1,5-diaminonaphthalene, metaxylylenediamine, paraxylylenediamine, 1,1-bis(4-aminophenyl)cyclohexane, or dicyanodiamide; novolac-type phenol resins such as a phenol novolac resin, a cresol novolac resin, a tert-butylphenol novolac resin, or a nonylphenol novolac resin; resol-type phenol resins, polyoxystyrenes such as polyparaoxystyrene; phenol aralkyl resins; phenol resins obtained by co-condensation of a phenol compound in which a hydrogen atom binding to an aromatic ring such as a benzene ring or a naphthalene ring is substituted with a hydroxyl group, with a carbonyl compound, such as a naphthol aralkyl resin; and an acid anhydride. These epoxy resin hardening agents may be used singly or in combination of two or more types.

Such epoxy resin hardening agent is mixed at an equivalent ratio of 0.1:1 to 10:1, and preferably 0.7:1 to 1.3:1, with respect the epoxy resin used.

In addition, for the purpose of promoting the hardening reaction of an epoxy resin in the present invention, a known hardening accelerator may be used. Examples of such hardening accelerator include: tertiary amine compounds such as 1,8-diaza-bicyclo(5,4,0)undecen-7, triethylenediamine, or benzyldimethylamine; imidazole compounds such as 2-methylimidazole, 2-ethyl-4-methylimidazole, 2-phenylimidazole, or 2-phenyl-4-methylimidazole; organic phosphine compounds such as triphenylphosphine or tributylphosphine; phosphonium salts; and ammonium salts. These hardening accelerators may be used singly or in combination of two or more types.

The polyvinyl benzyl ether resin used in the present invention is obtained from a polyvinyl benzyl ether compound. Such polyvinyl benzyl ether compound is preferably represented by the following general formula (1):

[Formula 1]

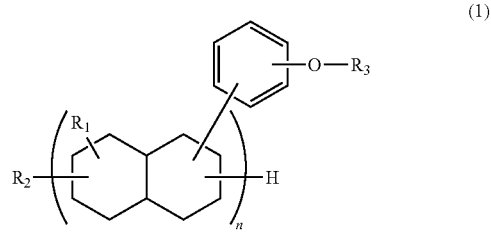

(1)

In the general formula (1), $R_1$ represents a methyl group or an ethyl group, and $R_2$ represents a hydrogen atom or a hydrocarbon group containing 1 to 10 carbon atoms. The hydrocarbon group represented by $R_2$ is an alkyl group, an aralkyl group, an aryl group, or the like, which may have a substituent. Examples of such alkyl group include a methyl group, an ethyl group, a propyl group, and a butyl group. An example of such aralkyl group is a benzyl group. An example of such aryl group is a phenyl group. $R_3$ represents a hydrogen atom or a vinylbenzyl group. The hydrogen atom represented by $R_3$ is derived from a starting compound used in the synthesis of the compound represented by the general formula (1). When the molar ratio between the hydrogen atom and the vinylbenzyl group is 60:40 to 0:100, the hardening reaction can be sufficiently promoted, and further, the composite dielectric material of the present invention preferably has sufficient dielectric property. In addition, n represents an integer of 2 to 4.

A polyvinyl benzyl ether compound may be singly used as a resin material in polymerization, or it may be copolymerized with another monomer(s). Copolymerizable monomers include styrene, vinyltoluene, divinylbenzene, divinyl benzyl ether, allylphenol, allyloxybenzene, diallyl phthalate, acrylic acid ester, methacrylic acid ester, vinylpyrrolidone, and a denaturated product thereof. These monomers are mixed at a weight percentage of 2% to 50% with respect to the weight of the polyvinyl benzyl ether compound.

Polymerization and hardening of the polyvinyl benzyl ether compound can be carried out by known methods. The hardening process can be carried out either in the presence or absence of a hardening agent. As such hardening agent, known radical polymerization initiators such as benzoyl peroxide, methyl ethyl ketone peroxide, dicumyl peroxide, or t-butyl perbenzoate can be used. As the amount of a hardening agent used, 0 to 10 parts by mass of a hardening agent is used with respect to 100 parts by mass of a polyvinyl benzyl ether compound. The hardening temperature is different depending on the presence or absence of a hardening agent and the type of a hardening agent. In order to sufficiently harden the polyvinyl benzyl ether compound, the hardening temperature is set at 20° C. to 250° C., and preferably at 50° C. to 250° C.

In order to adjust the hardening level, hydroquinone, benzoquinone, copper salts, and the like may be mixed.

As a thermoplastic resin used in the present invention, known thermoplastic resins such as a (meth)acryl resin, a hydroxystyrene resin, a novolac resin, a polyester resin, a polyimide resin, a nylon resin, or a polyetherimide resin can be used.

As a photosensitive resin that can be used in the present invention, known photosensitive resins can be used. For example, a photopolymerized resin or a photocrosslinking resin can be used.

Examples of the aforementioned photopolymerized resin include: those containing an acrylic copolymer having an ethylene unsaturated group (a photosensitive oligomer), a photopolymerized compound (a photosensitive monomer), and a photopolymerization initiator; and those containing an epoxy resin and a light cation polymerization initiator. Examples of such photosensitive oligomer include: a product obtained by adding acrylic acid to an epoxy resin; a product obtained by further reacting the aforementioned product with an acid anhydride; a product obtained by reacting a copolymer containing a (meth)acryl monomer having a glycidyl group with methacrylic acid; a product obtained by further reacting the aforementioned product with an acid anhydride; a product obtained by reacting a copolymer containing a (meth)acryl monomer having a hydroxyl group with glycidyl (meth)acrylate; a product obtained by further reacting the aforementioned product with an acid anhydride; and a product obtained by reacting a copolymer containing a maleic anhydride with a (meth)acryl monomer having a hydroxyl group or a (meth)acryl monomer having a glycidyl group. These compounds may be used singly or in combination of two or more types. However, examples are not particularly limited thereto.

Examples of a photopolymerized compound (a photosensitive monomer) include 2-hydroxyethyl (meth)acrylate, 2-hydroxypropyl (meth)acrylate, N-vinylpyrrolidone, acryloylmorpholine, methoxy polyethylene glycol (meth)acrylate, polyethylene glycol di(meth)acrylate, polypropylene glycol di(meth)acrylate, N,N-dimethylacrylamide, phenoxyethyl (meth)acrylate, cyclohexyl (meth)acrylate, trimethylolpropane (meth)acrylate, pentaerythritol tri(meth)acrylate, dipentaerythritol hexa(meth)acrylate, tris(hydroxyethyl)isocyanurate di(meth)acrylate, and tris(hydroxyethyl)isocyanurate tri(meth)acrylate. These photopolymerized compounds may be used singly or in combination of two or more types.

Examples of a photopolymerization initiator include benzoin and alkyl ethers thereof, benzophenones, acetophenones, anthraquinones, xanthones, and thioxanthones. These photopolymerization initiators may be used singly or by mixing them. In addition, commonly used known photopolymerization promoters such as benzoic acid-type promoters or tertiary amine-type promoters may be used in combination with such photopolymerization initiators. Examples of a photo-cationic polymerization initiator include triphenylsulfonium hexafluoroantimonate, diphenylsulfonium hexafluoroantimonate, triphenylsulfonium hexafluorophosphate, benzyl-4-hydroxyphenylmethylsulfonium hexafluorophosphate, and ferrous aromatic compound salts of Bronsted acid (Ciba-Geigy; CG24-061). These photo-cationic polymerization initiators may be used singly or in combination of two or more types.

With the use of a photo-cationic polymerization initiator, an epoxy resin is subjected to ring-opening polymerization. The reaction rate of photo polymerization is higher in use of an alicyclic epoxy resin than in use of a common glycidyl ester epoxy resin. Thus, the use of such alicyclic epoxy resin is preferable. It may also be possible to use an alicyclic epoxy resin in combination with a glycidyl ester epoxy resin. Examples of such alicyclic epoxy resin include vinylcyclohexene diepoxide, alicyclic diepoxy acetal, alicyclic diepoxy adipate, alicyclic diepoxy carboxylate, and EHPE-3150 manufactured by Daicel Chemical Industries, Ltd. These alicyclic epoxy resins may be used singly or by mixing them.

Examples of a photocrosslinking resin include water-soluble polymer dichromate, vinyl polycinnamate (Kodak KPR), and cyclized rubber azide (Kodak KTFR). These photocrosslinking resins may be used singly or in combination of two or more types. However, examples are not limited thereto.

The dielectric constant of such photosensitive resin is generally low (2.5 to 4.0). Accordingly, in order to increase the dielectric constant of a binder, a higher-dielectric polymer (for example, SDP-E of Sumitomo Chemical Co., Ltd. ($\in$: 15<); Cyanoresin of Shin-Etsu Chemical Co., Ltd. ($\in$: 18<)) or a higher-dielectric liquid (for example, SDP-S of Sumitomo Chemical Co., Ltd. ($\in$: 40<)) may be added within a range that does not impair the photosensitive property of a photosensitive resin.

In the present invention, the aforementioned polymeric materials may be used, as appropriate, singly or in combination of two or more types.

In the composite dielectric material of the present invention, 150 to 1800 parts by weight of, and preferably 300 to 600 parts by weight of the aforementioned modified perovskite-type composite oxide is mixed with respect to 100 parts by weight of a resin solid. This is because, if the mixing amount of the modified perovskite-type composite oxide is less than 150 parts by weight, a sufficient relative dielectric constant may not be obtained, and if it exceeds 1800 parts by weight, it is likely that viscosity increases and dispersibility deteriorates, and also it is feared that sufficient strength unfavorably cannot be obtained during consolidation of a composite.

In addition, the composite dielectric material of the present invention may further comprise a filler within an additive amount that does not impair the advantages of the present invention. Examples of a filler that can be used herein include fine carbon particles such as acetylene black or ketchen black, fine graphite particles, and silicon carbide.

Moreover, in addition to the aforementioned compounds, the composite dielectric material of the present invention may further comprise a hardening agent, glass powders, a coupling agent, a macromolecular additive, a reaction diluent, a polymerization inhibitor, a leveling agent, a wetting improver, a surfactant, a plasticizer, an ultraviolet absorber, an antioxidant, an antistatic agent, an inorganic filler, a fungicide, a humidity controller, a dye-dissolving agent, a buffer, a chelating agent, a fire retardant, and a silane coupling agent. These additives may be used singly or in combination of two or more types.

The composite dielectric material of the present invention can be produced by preparing a composite dielectric paste, and then eliminating a solvent or performing a hardening reaction or a polymerization reaction.

The aforementioned composite dielectric paste comprises resin ingredients, the aforementioned inorganic dielectric powders, an additive(s), which may be added as necessary, and an organic solvent added as necessary.

The aforementioned resin ingredients contained in the dielectric paste are a polymerizable compound of a thermosetting resin, a polymer of a thermoplastic resin, and a polymerizable compound of a photosensitive resin. These resin ingredients may be used singly or in the form of a mixture thereof, as necessary.

The term "polymerizable compound" is used herein to mean a compound having a polymerizable group. For example, such polymerizable compound includes a precursor polymer before termination of complete hardening, a polymerizable oligomer, and a monomer. In addition, the term "polymer" is used herein to mean a compound obtained after a polymerization reaction has been substantially completed.

An organic solvent added as necessary differs depending on resin ingredients used. The type of such organic solvent is not particularly limited, as long as it is able to dissolve such resin ingredients. In many cases, examples of such organic solvent include N-methylpyrrolidone, dimethylformamide, ether, diethyl ether, tetrahydrofuran, dioxane, ethyl glycol ether of monoalcohol containing 1 to 6 carbon atoms optionally having a branched alkyl group, propylene glycol ether, butyl glycol ether, ketone, acetone, methyl ethyl ketone, methyl isopropyl ketone, methyl isobutyl ketone, cyclohexanone, ester, ethyl acetate, butyl acetate, ethylene glycol acetate, methoxy propyl acetate, methoxy propanol, other halogen hydrocarbons, and alicyclic and/or aromatic hydrocarbons. Of these, solvents such as hexane, heptane, cyclohexane, toluene, and dixylene can be used. These solvents may be used singly or in the form of a mixture thereof.

In the present invention, the aforementioned composite dielectric paste is prepared to have a desired viscosity and is then used. In many cases, it is preferable that the viscosity of such composite dielectric paste be set at 1,000 to 1,000,000 mPa·s (25° C.), and preferably at 10,000 to 600,000 mPa·s (25° C.), because the coating property of the composite dielectric paste becomes favorable.

The composite dielectric material of the present invention can be used as a film, or it can be processed into a bulk-state or a certain-shaped molded body and it can be then used. The present composite dielectric material can be particularly used as a thin-film high-dielectric film.

For example, in order to produce a composite dielectric film using the composite dielectric material of the present invention, it may be produced according to a conventional known method of using a composite dielectric paste. An example will be given below.

The aforementioned composite dielectric paste is applied onto a substrate, and it is then dried, so as to mold it into a film. As such substrate, a plastic film on the surface of which a delamination treatment has been performed can be used, for example. The aforementioned composite dielectric paste is applied onto the plastic film on the surface of which a delamination treatment has been performed, so that it is molded into a film state. In such a case, in general, after the molding process, it is preferable that the substrate be removed from the film before use. Examples of such plastic film used as a substrate include a polyethylene terephthalate (PET) film, a polyethylene film, a polypropylene film, a polyester film, a polyimide film, and a film made of aramid, Kapton, or polymethylpentene. Such plastic film used as a substrate has a thickness of preferably 1 to 100 µm, and more preferably 1 to 40 µm. In addition, as a mold-releasing treatment performed on the surface of a substrate, a mold-releasing treatment in which silicon, wax, a fluorine resin, or the like is applied onto the surface of the substrate is preferably used.

Moreover, a metallic foil may be used as a substrate, and a dielectric film may be formed on the metallic foil. In such a case, a metallic foil used as a substrate can be used as an electrode of a condenser.

The type of a method of applying the aforementioned composite dielectric paste onto a substrate is not particularly limited. A common application method can be used. Examples of such method include a roller method, a spray method, and a silk-screen method.

After such dielectric film has been incorporated into a board such as a printed board, it can be then thermally hardened by heating. On the other hand, when a photosensitive resin is used, it can be subjected to patterning by selective exposure.

Moreover, the composite dielectric material of the present invention may be subjected to extrusion molding according to a calendar method or the like, so that it may be molded into a film state.

The thus extrusion-molded dielectric film may be molded such that it may be extruded onto the aforementioned substrate. When a metallic foil is used as a substrate, examples of such metallic foil include foils made from materials such as copper, aluminum, brass, nickel, or iron, and a foil consisting of the alloy thereof, and a composite foil. A surface roughening treatment or a treatment such as application of an adhesive, may be performed on such metallic foil, as necessary.

In addition, a dielectric film may be formed between such metallic foils. In this case, the aforementioned composite dielectric paste is applied onto a metallic foil, and another metallic foil is then placed thereon. Thereafter, the composite dielectric paste is dried in a state in which it is sandwiched between the metallic foils, so as to form a dielectric film that is in a state in which it is sandwiched between the metallic foils. Moreover, such dielectric film may also be formed between such metallic foils by subjecting the film to extrusion molding such that it can be sandwiched between them.

Moreover, using the aforementioned organic solvent, the composite dielectric material of the present invention may be processed into varnish, and a cloth or non-woven fabric may be impregnated with this varnish. It may be then dried to prepare a prepreg. The type of such cloth or non-woven fabric that can be used herein is not particularly limited. Known products may be used. Examples of such cloth that can be used herein include a glass cloth, an aramid cloth, a carbon cloth, and stretched porous polytetrafluoroethylene. Examples of such non-woven fabric that can be used herein include an aramid non-woven fabric and a glass paper. The prepreg is laminated on an electronic component such as a circuit board, followed by hardening, so that an insulation layer can be introduced into the electronic component.

The composite dielectric material of the present invention has a high relative dielectric constant. Thus, it can be particularly preferably used as a dielectric layer for electronic components such as a print circuit board, a semiconductor package, a condenser, a high-frequency antenna, or an inorganic EL.

In order to produce a multilayer print circuit board using the composite dielectric material of the present invention, it can be produced by a method known in the present technical field (for example, please see Japanese Patent Laid-Open Nos. 2003-192768, 2005-29700, 2002-226816, 2003-327827, etc.). The following example shows a case in which a thermosetting resin is used as a polymeric material of the composite dielectric material.

The composite dielectric material of the present invention is processed into the aforementioned dielectric film. The resin surface of the dielectric film is laminated on a circuit board by pressurization, heating, or using a vacuum laminator. After completion of the lamination, the substrate is removed from the film, and a metallic foil is further laminated on the exposed resin layer, and the resin is then hardened by heating.

A prepreg produced from the composite dielectric material of the present invention can be laminated on a circuit board by vacuum pressing. Specifically, it is desired that one surface of such prepreg be allowed to come into contact with a circuit board, and that a metallic foil be placed on the other surface, followed by pressing.

In addition, the composite dielectric material of the present invention is used as varnish, and the varnish is applied onto a circuit board by screen printing, curtain coating, roll coating, spray coating, etc., and it is then dried, so as to form an intermediate insulation layer of a multilayer printed wiring board.

In the present invention, when a printed wiring board comprising an insulation layer as the outermost layer is produced, a through hole or a via hole is made using a drill or a laser, and the surface of an insulation layer is treated with a roughening agent to form fine bumps and dips. As a method of roughening an insulation layer, a method of immersing a board, on which an insulation resin layer has been formed, in a solution of an oxidizer and the like, a method of spraying a solution of an oxidizer and the like, etc. can be applied depending on technical specification. Specific examples of a roughening agent include: oxidizers such as dichromate, permanganate, ozone, hydrogen peroxide/sulfuric acid, or nitric acid; organic solvents such as N-methyl-2-pyrrolidone, N,N-dimethylformamide, or methoxypropanol; alkaline aqueous solutions such as caustic soda or potassium hydroxide; acidic aqueous solutions such as sulfuric acid or hydrochloric acid; and various types of plasma treatments. Such treatments may be used in combination. As described above, a printed wiring board, on which an insulation layer has been roughened, is then subjected to dry plating such as evaporation, sputtering or ion plating, or wet plating such as nonelectrolytic or electrolytic plating, so as to form a conductor layer thereon. During this process, it may also be possible to form a plating resist in a pattern opposite to the conductor layer, and to form a conductor layer only by nonelectrolytic plating. After a conductor layer has been formed as described above, it may be subjected to an annealing treatment to promote the hardening of a thermosetting resin, so as to further improve the peeling strength of the conductor layer. Thus, a conductor layer can be formed as an outermost layer.

Moreover, a metallic foil that forms the aforementioned intermediate insulation layer may be multilayered by laminating it by vacuum pressing. Such metallic foil that forms an intermediate insulation layer is laminated on a printed wiring board, in which an inner layer circuit has been formed, by vacuum pressing, so as to produce a printed wiring board comprising a conductor layer as an outermost layer thereof. Furthermore, a prepreg using the composite dielectric material of the present invention, together with a metallic foil, is laminated on the printed wiring board, in which an inner layer circuit has been formed, by vacuum pressing, so as to produce a printed wiring board comprising a conductor layer as an outermost layer thereof. A certain through hole or a via hole is made by a conformal method using a drill or a laser, and desmearing is then performed on the insides of such through hole and via hole, so as to form fine bumps and dips. Thereafter, wetting plating such as nonelectrolytic or electrolytic plating is performed so as to enable continuity between layers.

Further, these operations are repeated several times, as necessary, and after completion of the circuit formation of the outermost layer, a solder mask is subjected to pattern printing and thermosetting according to a screen printing method, or to whole surface printing and thermosetting according to curtain coating, roll coating or spray coating. Thereafter, a pattern is formed with a laser, so as to obtain a desired multilayer printed wiring board.

EXAMPLES

The present invention will be described in the following examples. However, these examples are not intended to limit the scope of the present invention.

<Perovskite-Type Composite Oxide Sample>

As a perovskite-type composite oxide sample to be modified, commercially available $(Ba_{0.92}Ca_{0.08})(Ti_{0.71}Zr_{0.29})O_3$ with the following physical properties, which had been obtained by a solid-phase method, was used. Mean particle diameter was obtained by a laser light scattering method. In addition, 4 g of the perovskite-type composite oxide was dispersed in 100 ml of pure water to prepare a 4%-by-weight slurry. The slurry was stirred at 25° C. at 100 rpm for 1 hour, and the pH of the supernatant was then measured with a pH meter. As a result, the pH was found to be 9.22.

TABLE 1

|  | Mean particle diameter (μm) | BET specific surface area (m$^2$/g) |
| --- | --- | --- |
| Sample | 0.76 | 2.17 |

Example 1

Step A1

100 parts by weight of the aforementioned perovskite-type composite oxide sample was added to 150 parts by weight of ethanol, and the mixture was sufficiently dispersed to prepare a slurry.

Step A2

Subsequently, while stirring, tetraethoxysilane was added to the slurry, resulting in 5 parts by weight. Thereafter, 12 parts by weight of a 20%-by-weight tetramethyl ammonia hydroxide aqueous solution was added thereto, and the obtained mixture was then reacted at 50° C. for 3 hours. After completion of the reaction, solid-liquid separation was carried out according to an ordinary method, and the separated cake was dispersed in 300 parts by weight of ethanol, and the dispersion was then stirred for 1 hour. Thereafter, solid-liquid separation was carried out again, and the resultant was then dried at 80° C. for 20 hours, followed by disintegration, so as to obtain a perovskite-type composite oxide coated with hydrolyzed silica.

Step A3

Subsequently, the obtained hydrolyzed silica-coated perovskite-type composite oxide was subjected to a heat treatment at 900° C. for 4 hours in the air, so as to obtain a modified perovskite-type composite oxide sample that was primarily coated with silica. Thereafter, 4 g of the obtained perovskite-type composite oxide sample primarily coated with silica was dispersed in 100 ml of pure water to prepare a 4%-by-weight slurry, and the slurry was then stirred at 25° C. at 100 rpm for 1 hour. Thereafter, the pH of the supernatant was measured with a pH meter. As a result, the pH was found to be 6.08. The physical properties of the obtained perovskite-type composite oxide sample primarily coated with silica are shown in Table 2.

Step A4

100 parts by weight of the perovskite-type composite oxide primarily coated with silica obtained in the step A3 above was added to 200 parts by weight of water. Thereafter, 5 parts by weight of an aqueous titanate coupling agent (manufactured by Ajinomoto Fine-Techno Co., Inc.; product name: KR-44) was added thereto, and the obtained mixture was stirred at 80° C. for 1 hour. Thereafter, the reaction solution was cooled, and solid-liquid separation was then carried out. The separated cake was further dispersed in 300 parts by weight of water, and the dispersion was then stirred for 1 hour, followed by solid-liquid separation again. The separated cake was dried at 105° C. for 24 hours, followed by disintegration, so as to obtain a modified perovskite-type composite oxide sample, in which the particle surface of the perovskite-type composite oxide primarily coated with silica was secondarily coated with the titanate coupling agent. Thereafter, 4 g of the modified perovskite-type composite oxide sample secondarily coated with the coupling agent was dispersed in 100 ml of pure water to prepare a 4%-by-weight slurry. The slurry was stirred at 25° C. at 100 rpm for 1 hour, and the pH of the supernatant was then measured with a pH meter. As a result, the pH was found to be 6.07. The physical properties of the thus obtained modified perovskite-type composite oxide are shown in Table 3.

Example 2

Steps A1 to A3

A coating treatment was carried out under the same conditions as those of Example 1 to obtain a perovskite-type composite oxide sample that was primarily coated with silica. Moreover, the pH of a supernatant of a slurry containing the perovskite-type composite oxide sample primarily coated with silica, which had been obtained in the same manner as that of Example 1, was measured. As a result, the pH was found to be 6.08. The physical properties of the obtained perovskite-type composite oxide sample primarily coated with silica are shown in Table 2.

Step A4

1000 parts by weight of the perovskite-type composite oxide primarily coated with silica, which had been obtained in the above describe step A3, was added to a coffee mill. While stirring, 15 parts by weight of a silane coupling agent (manufactured by Shin-Etsu Chemical Co., Ltd.; product name: KBE-403) was added thereto over 1 minute, and the obtained mixture was further stirred for 2 minutes. Thereafter, the processed powders were taken out, and were then added to the coffee mill again, followed by stirring for 2 minutes. Thereafter, the processed powders were taken out. As a result of such operations, the concentration of the added silane coupling agent was calculated to be 1.48% by weight. The processed powders were subjected to ventilation drying at 80° C. for 20 hours. During the drying process, a portion of the coupling agent was evaporated. Thereafter, through a hydrolysis process and a dehydration condensation process, the particle surface of the perovskite-type composite oxide primarily coated with silica used as a substrate was further secondarily coated with the silane coupling agent, so as to obtain a modified perovskite-type composite oxide sample. Moreover, the pH of a supernatant of a slurry containing the modified perovskite-type composite oxide sample secondarily coated with the coupling agent, which had been obtained in the same manner as that of Example 1, was measured. As a result, the pH was found to be 5.73. The physical properties of the obtained modified perovskite-type composite oxide are shown in Table 3.

Example 3

Steps A1 to A3

The step A1 was carried out in the same manner as that of Example 1 to obtain a slurry containing a perovskite-type composite oxide. Subsequently, tetraethoxysilane was added to the slurry, resulting in 2.5 parts by weight. Thereafter, 6 parts by weight of a 20%-by-weight tetramethylammonium hydroxide aqueous solution was added thereto, and the obtained mixture was then reacted at 60° C. for 3 hours. After completion of the reaction, solid-liquid separation was carried out according to an ordinary method, and the separated cake was dispersed in 300 parts by weight of ethanol, and the dispersion was then stirred for 1 hour. Thereafter, solid-liquid separation was carried out again, and the resultant was then dried at 80° C. for 20 hours, followed by disintegration, so as to obtain a perovskite-type composite oxide coated with hydrolyzed silica.

Subsequently, the obtained hydrolyzed silica-coated perovskite-type composite oxide was subjected to a heat treatment at 900° C. for 4 hours in the air in the same manner as that of Example 1, so as to obtain a perovskite-type composite oxide sample that was primarily coated with silica. Moreover, the pH of a supernatant of a slurry containing the perovskite-type composite oxide sample primarily coated with silica, which had been obtained in the same manner as that of Example 1, was measured. As a result, the pH was found to be 6.08. The physical properties of the obtained perovskite-type composite oxide sample primarily coated with silica are shown in Table 2.

Step A4

Subsequently, the step A4 was carried out in the same manner as that of Example 1, so as to obtain a modified perovskite-type composite oxide sample that was secondarily coated with an aqueous titanate coupling agent (manufactured by Ajinomoto Fine-Techno Co., Inc.; product name: KR-44). Moreover, the pH of a supernatant of a slurry containing 4 g of the modified perovskite-type composite oxide sample secondarily coated with the coupling agent, which had been obtained in the same manner as that of Example 1, was measured. As a result, the pH was found to be 6.07. The physical properties of the thus obtained modified perovskite-type composite oxide are shown in Table 3.

Example 4

Steps A1 to A3

A perovskite-type composite oxide sample primarily coated with silica was obtained by applying the same operations and same conditions as those of Example 3 with the exception that the temperature required for the heat treatment of the hydrolyzed silica-coated perovskite-type composite oxide was set at 1000° C. in the step A3. Moreover, the pH of a supernatant of a slurry containing the perovskite-type composite oxide sample primarily coated with silica, which had been obtained in the same manner as that of Example 3, was measured. As a result, the pH was found to be 7.78. The physical properties of the obtained perovskite-type composite oxide sample primarily coated with silica are shown in Table 2.

Step A4

Subsequently, the obtained perovskite-type composite oxide sample was treated with an aqueous titanate coupling agent (manufactured by Ajinomoto Fine-Techno Co., Inc.; product name: KR-44) under the same conditions as those of Example 1, so as to obtain a modified perovskite-type composite oxide sample that was secondarily coated with the titanate coupling agent. Moreover, the pH of a supernatant of a slurry containing the modified perovskite-type composite oxide sample secondarily coated with the coupling agent, which had been obtained in the same manner as that of Example 1, was measured. As a result, the pH was found to be 7.45. The physical properties of the thus obtained modified perovskite-type composite oxide are shown in Table 3.

Example 5

Steps A1 to A3

A coating treatment was carried out under the same conditions as those of Example 3, so as to obtain a perovskite-type composite oxide sample that was primarily coated with silica. Moreover, the pH of a supernatant of a slurry containing the perovskite-type composite oxide sample primarily coated with silica, which had been obtained in the same manner as that of Example 3, was measured. As a result, the pH was found to be 6.08. The physical properties of the obtained perovskite-type composite oxide sample primarily coated with silica are shown in Table 2.

Step A4

Subsequently, the step A4 was carried out in the same manner as that of Example 2, so as to obtain a modified perovskite-type composite oxide sample that was secondarily coated with a silane coupling agent (manufactured by Shin-Etsu Chemical Co., Ltd.; product name: KBE-403). Moreover, the pH of a supernatant of a slurry containing 4 g of the modified perovskite-type composite oxide sample secondarily coated with the coupling agent, which had been obtained in the same manner as that of Example 1, was measured. As a result, the pH was found to be 5.73. The physical properties of the thus obtained modified perovskite-type composite oxide are shown in Table 3.

Example 6

Steps A1 to A3

A coating treatment was carried out under the same conditions as those of Example 4, so as to obtain a perovskite-type composite oxide sample that was primarily coated with silica. Moreover, the pH of a supernatant of a slurry containing the perovskite-type composite oxide sample primarily coated with silica, which had been obtained in the same manner as that of Example 3, was measured. As a result, the pH was found to be 7.78. The physical properties of the obtained perovskite-type composite oxide sample primarily coated with silica are shown in Table 2.

Step A4

Subsequently, the step A4 was carried out in the same manner as that of Example 2, so as to obtain a modified perovskite-type composite oxide sample that was secondarily coated with a silane coupling agent (manufactured by Shin-Etsu Chemical Co., Ltd.; product name: KBE-403). Moreover, the pH of a supernatant of a slurry containing 4 g of the modified perovskite-type composite oxide sample secondarily coated with the coupling agent, which had been obtained in the same manner as that of Example 1, was measured. As a result, the pH was found to be 7.45. The physical properties of the thus obtained modified perovskite-type composite oxide are shown in Table 3.

Comparative Example 1

Steps A1 to A3

A perovskite-type composite oxide sample primarily coated with silica was obtained by applying the same operations and same conditions as those of Example 3 with the exception that the temperature required for the heat treatment of the hydrolyzed silica-coated perovskite-type composite oxide was set at 500° C. in the step A3. Moreover, the pH of a supernatant of a slurry containing the perovskite-type composite oxide sample primarily coated with silica, which had been obtained in the same manner as that of Example 1, was measured. As a result, the pH was found to be 8.42. The physical properties of the obtained perovskite-type composite oxide sample primarily coated with silica are shown in Table 2.

Step A4

Subsequently, the obtained perovskite-type composite oxide sample was treated with an aqueous titanate coupling agent (manufactured by Ajinomoto Fine-Techno Co., Inc.; product name: KR-44) under the same conditions as those of Example 1, so as to obtain a modified perovskite-type composite oxide sample that was secondarily coated with the titanate coupling agent. Moreover, the pH of a supernatant of a slurry containing the modified perovskite-type composite oxide sample secondarily coated with the coupling agent, which had been obtained in the same manner as that of Example 1, was measured. As a result, the pH was found to be 7.73. The physical properties of the thus obtained modified perovskite-type composite oxide are shown in Table 3.

Comparative Example 2

Steps A1 to A3

A perovskite-type composite oxide sample primarily coated with silica was obtained by applying the same operations and same conditions as those of Example 3 with the exception that the temperature required for the heat treatment of the hydrolyzed silica-coated perovskite-type composite oxide was set at 700° C. in the step A3. Moreover, the pH of a supernatant of a slurry containing the perovskite-type composite oxide sample primarily coated with silica, which had been obtained in the same manner as that of Example 1, was measured. As a result, the pH was found to be 9.9. The physical properties of the obtained perovskite-type composite oxide sample primarily coated with silica are shown in Table 2.

Step A4

Subsequently, the obtained perovskite-type composite oxide sample was treated with an aqueous titanate coupling agent (manufactured by Ajinomoto Fine-Techno Co., Inc.; product name: KR-44) under the same conditions as those of Example 1, so as to obtain a modified perovskite-type composite oxide sample that was secondarily coated with the titanate coupling agent. Moreover, the pH of a supernatant of a slurry containing the modified perovskite-type composite oxide sample secondarily coated with the coupling agent, which had been obtained in the same manner as that of Example 1, was measured. As a result, the pH was found to be 7.89. The physical properties of the thus obtained modified perovskite-type composite oxide are shown in Table 3.

TABLE 2

| | Perovskite-type composite oxide sample obtained in step A3 | | | |
|---|---|---|---|---|
| | Heat treatment temperature (°C.) | 1) Silica-coating amount (% by weight) | 2) Silica-coating amount per unit surface area (mol/m$^2$) | pH |
| Example 1 | 900 | 0.64 | $5.08 \times 10^{-5}$ | 6.08 |
| Example 2 | 900 | 0.64 | $5.08 \times 10^{-5}$ | 6.08 |
| Example 3 | 900 | 0.54 | $4.21 \times 10^{-5}$ | 6.08 |
| Example 4 | 1000 | 0.54 | $4.46 \times 10^{-5}$ | 7.78 |
| Example 5 | 900 | 0.54 | $4.21 \times 10^{-5}$ | 6.08 |
| Example 6 | 1000 | 0.54 | $4.46 \times 10^{-5}$ | 7.78 |
| Comparative example 1 | 500 | 0.53 | $4.13 \times 10^{-5}$ | 8.42 |
| Comparative example 2 | 700 | 0.53 | $4.06 \times 10^{-5}$ | 9.9 |

It is to be noted that "1) Silica-coating amount" in Table 2 was obtained by dissolving it in a hydrochloric acid aqueous solution and then applying ICP-AES thereto. In addition, "2) Silica-coating amount per unit surface area" is a calculation value per weight, which is converted relative to a specific surface area value.

TABLE 3

| | Perovskite-type composite oxide sample obtained in step A4 | | |
|---|---|---|---|
| | Type of coupling agent | Coupling agent-coating amount (% by weight) | pH |
| Example 1 | Titanate coupling agent | 0.27 | 6.07 |
| Example 2 | Silane coupling agent | 0.7 | 5.73 |
| Example 3 | Titanate coupling agent | 0.27 | 6.07 |
| Example 4 | Titanate coupling agent | 0.27 | 7.45 |
| Example 5 | Silane coupling agent | 0.7 | 5.73 |
| Example 6 | Silane coupling agent | 0.7 | 7.45 |
| Comparative example 1 | Titanate coupling agent | 0.27 | 7.73 |
| Comparative example 2 | Titanate coupling agent | 0.27 | 7.89 |

It is to be noted that the coupling agent-coating amount in Table 3 indicates the amount of the coupling agent with respect to the perovskite-type composite oxide primarily coated with silica. Such coating amount was obtained by measuring the amount of carbon in the thermally decomposed sample according to the analysis and measurement of total carbon in a solid, and then calculating the amount of the coupling agent immobilized on the surface of the oxide after a drying process based on a molecular structure assumed from the hydrolysis and dehydration condensation of each coupling agent.

Comparative Example 3

The steps A1 to A3 were carried out in the same manner as that of Example 3 with the exception that the step A4 was not performed, so as to obtain a perovskite-type composite oxide sample primarily coated with silica, which was then used as a sample. The pH was measured in the same manner as that of Example 1. As a result, the pH of the supernatant was found to be 6.08.

Comparative Example 4

The steps A1 to A3 were carried out in the same manner as that of Example 4 with the exception that the step A4 was not performed, so as to obtain a perovskite-type composite oxide sample primarily coated with silica, which was then used as a sample. The pH was measured in the same manner as that of Example 1. As a result, the pH of the supernatant was found to be 7.78.

Comparative Example 5

100 parts by weight of the aforementioned perovskite-type composite oxide was added to a coffee mill. While stirring, 1.2 parts by weight of a silane coupling agent (manufactured by Shin-Etsu Chemical Co., Ltd.; product name: KBM-403) was added thereto over 1 minute, and the obtained mixture was further stirred for 2 minutes. Thereafter, the processed powders were taken out, and were than added to the coffee mill again, followed by stirring for 2 minutes. Thereafter, the processed powders were taken out. As a result of such operations, the concentration of the silane coupling agent immobilized after a drying process was calculated to be 0.73% by weight. The processed powders were subjected to ventilation drying at 80° C. for 20 hours. During the drying process, the coupling agent was subjected to a hydrolysis process and a dehydration condensation process, so as to obtain a perovskite-type composite oxide coated with the silane coupling agent. The pH was measured in the same manner as that of Example 1. As a result, the pH of the supernatant was found to be 5.73.

<Elution Test>

4 g each of the modified perovskite-type composite oxide samples obtained in Examples 1 to 6 and Comparative examples 1 to 5 was dispersed in 100 ml of pure water to prepare a 4%-by-weight slurry. The slurry was stirred at 25° C. at 100 rpm for 1 hour, and was then separated by filtration. The concentrations of Ba, Ca, Ti, and Si in the filtrate were quantified by ICP-AES. Moreover, the perovskite-type composite oxide sample, which had been untreated, was also provided as Comparative example 6. The results are shown in Table 5.

TABLE 4

| | Modified perovskite-type composite oxide sample | | | |
|---|---|---|---|---|
| | Ba-eluted amount (ppm) | Ca-eluted amount (ppm) | Ti-eluted amount (ppm) | Si-eluted amount (ppm) |
| Example 1 | 71 | 2.5 | 3.3 | 34.8 |
| Example 2 | 291 | 13 | 1.5 | 25.3 |
| Example 3 | 72 | 2.7 | 3.4 | 34.5 |
| Example 4 | 190 | 7.7 | 0.4 | 11.8 |
| Example 5 | 290 | 12 | 1.3 | 24.1 |
| Example 6 | 250 | 10 | 1.2 | 23.1 |
| Comparative example 1 | 555 | 22.2 | 0.4 | 199 |
| Comparative example 2 | 612 | 25.1 | 0.5 | 146 |
| Comparative example 3 | 343 | 13.3 | 1 | 32.7 |
| Comparative example 4 | 318 | 17.2 | 0.5 | 21 |
| Comparative example 5 | 714 | 34.7 | 5.7 | 321 |
| Comparative example 6 | 788 | 51.9 | 0.4 | N.D |

Note)
"N.D." in the table indicates a detection limit of 1 ppm or less.

Examples 7 to 12, Comparative Examples 7 and 8, and Reference Examples 1 and 2

Preparation of Composite Dielectric Material

The modified perovskite-type composite oxide samples of Examples 1 to 6 and Comparative examples 1 and 2, and also an unmodified perovskite-type composite oxide sample (Comparative example 6) were used as inorganic fillers to prepare the epoxy resin compositions shown in Table 5.

A thermosetting epoxy resin (manufactured by Japan Epoxy Resins Co., Ltd.; product name: Epicoat 815; molecular weight: approx. 330; specific gravity: 1.1; nominal viscosity at 25° C.: 9 to 12 P) was used.

In addition, as a hardening accelerator, 1-isobutyl-2-methylimidazole was used. The nominal viscosity at 25° C. of the hardening accelerator was 4 to 12 P.

Moreover, in order to mix the inorganic filler into the epoxy resin, an agitator with defoaming function (manufactured by THINKY; product name: Awatori Rentaro) was used. For such mixing, a stirring operation was carried out for 5 minutes, and a defoaming operation was carried out for 5 minutes.

Furthermore, an epoxy resin composition, to which no inorganic fillers had been added, was prepared, and this was also shown in Table 5 as Reference example 2.

<Evaluation of Composite Dielectric Material>

An O-ring manufactured by Viton was placed on a plastic base, and the above prepared composite dielectric sample was poured into this ring. A plastic plate was further placed on the upper portion thereof, followed by hardening in a drying machine at 120° C. for 30 minutes, so as to prepare a disc-shaped sample to be evaluated. Since the wire diameter of the O-ring was 1.5 mm and the inner diameter was 11 mm, the effective size of the sample was approximately 1.5 mm in thickness and approximately 10 mm in diameter.

In order to evaluate electric properties according to a parallel-plate method, the surface of the disc was subjected to electrode application. A mask of 6 mmϕ was attached to one surface of the disk, and it was then subjected to platinum evaporation to a film thickness of 20 nm. For the other surface, the entire surface of the disk was subjected to platinum evaporation to a film thickness of 20 nm.

Subsequently, the insulation resistance value, and relative dielectric constant and dielectric loss at 25° C. of the thus electrode-applied composite dielectric material were measured. The results are shown in Tables 5 and 6.

It is to be noted that electric properties were evaluated using an LCR meter, and that the frequency was set at 1 kHz and the signal voltage was set at 1 V. The sample was disposed in a temperature-controlled chamber, and it was evaluated as temperature characteristics between −55° C. and 150° C.

TABLE 5

| | Example 7 | Example 8 | Example 9 | Example 10 | Example 11 | Example 12 | Comparative example 7 | Comparative example 8 | Reference example 1 | Reference example 2 |
|---|---|---|---|---|---|---|---|---|---|---|
| Epoxy resin (part by weight) | 3 | 3 | 3 | 3 | 3 | 3 | 3 | 3 | 3 | 3 |
| Hardening accelerator (part by weight) | 0.24 | 0.24 | 0.24 | 0.24 | 0.24 | 0.24 | 0.24 | 0.24 | 0.24 | 0.24 |
| Type of inorganic filler | Examp 11 | Examp 12 | Examp 13 | Examp 14 | Examp 15 | Examp 16 | Comparative example 1 | Comparative example 2 | Comparative example 6 | — |
| Mixing amount of inorganic filler (part by weight) | 9 | 9 | 9 | 9 | 9 | 9 | 9 | 9 | 9 | — |

TABLE 5-continued

|  | Example 7 | Example 8 | Example 9 | Example 10 | Example 11 | Example 12 | Comparative example 7 | Comparative example 8 | Reference example 1 | Reference example 2 |
|---|---|---|---|---|---|---|---|---|---|---|
| Mixing ratio of inorganic filler (% by weight) | 75 | 75 | 75 | 75 | 75 | 75 | 75 | 75 | 75 | — |
| Insulation resistance $\Omega$ ($\times 10^{13}$) | 21.3 | 18.2 | 21.2 | 8.1 | 18.1 | 7.3 | 21.1 | 14 | 28.8 | 45 |
| Relative dielectric constant | 27.28 | 27.39 | 27.19 | 27.81 | 27.12 | 27.13 | 24.61 | 24.85 | 28.06 | 5.83 |
| Dielectric loss(%) | 0.93 | 1.33 | 1.98 | 2.11 | 1.32 | 1.7 | 1.63 | 1.24 | 1.5 | 1.67 |

INDUSTRIAL APPLICABILITY

The modified perovskite-type composite oxide of the present invention suppresses elution of A-site metals such as Ba, Ca, Sr, and Mg, caused by contact with water content and the like. The modified perovskite-type composite oxide can be particularly preferably used as an inorganic filler used in a composite dielectric body.

The invention claimed is:

1. A method for producing a modified perovskite-type composite oxide, comprising the steps of:
   (A1) preparing a slurry comprising a perovskite-type composite oxide and a hydrophilic organic solvent;
   (A2) adding tetraalkoxysilane to the slurry, and carrying out a hydrolysis reaction in the presence of a catalyst to precipitate silica on the particle surface of the perovskite-type composite oxide, so as to obtain a perovskite-type composite oxide coated with the hydrolyzed silica;
   (A3) drying at 60° C. to 120° C. and then performing a heat treatment at 800° C. to 1200° C. over three hours on the perovskite-type composite oxide coated with the hydrolyzed silica, so as to obtain a perovskite-type composite oxide that is primarily coated with silica, which has pH 8.0 or less that is obtained by contact with water; and
   (A4) allowing the perovskite-type composite oxide that is primarily coated with silica to come into contact with a coupling agent.

* * * * *